Figure 1:
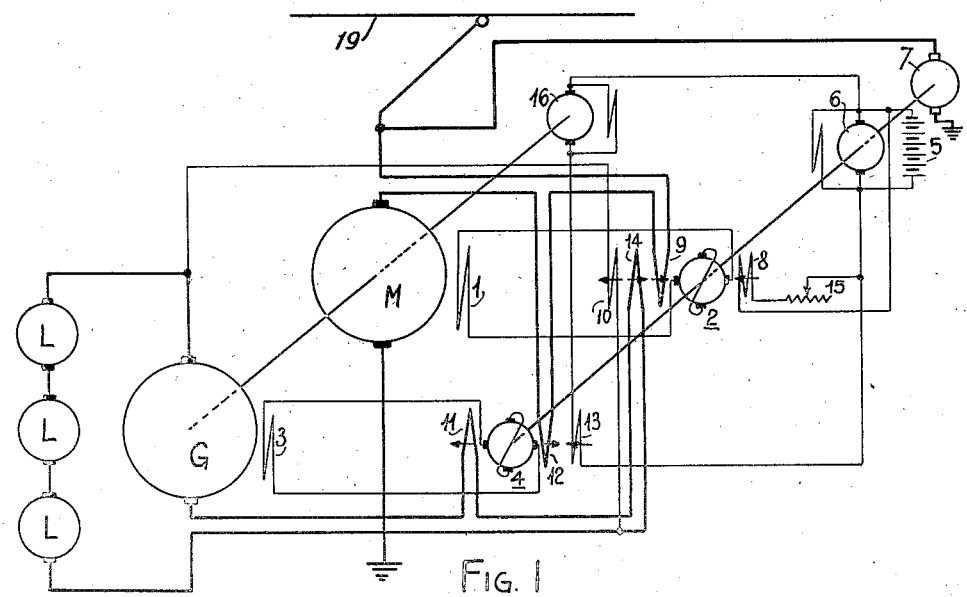

Aug. 2, 1938.    J. M. PESTARINI    2,125,806
ELECTRICAL EQUIPMENT
Filed Feb. 11, 1937    2 Sheets-Sheet 1

INVENTOR

Aug. 2, 1938.  J. M. PESTARINI  2,125,806
ELECTRICAL EQUIPMENT
Filed Feb. 11, 1937  2 Sheets-Sheet 2

Inventor:
Joseph M. Pestarini
by Harry E. Dunham
His Attorney.

Patented Aug. 2, 1938

2,125,806

UNITED STATES PATENT OFFICE 2,125,806

ELECTRICAL EQUIPMENT

Joseph M. Pestarini, Staten Island, N. Y.

Application February 11, 1937, Serial No. 125,254
In Great Britain February 20, 1936

9 Claims. (Cl. 172—239)

My invention relates to electrical equipment and has particular reference to motor generator and motor-booster sets.

The object of the invention is to provide an improved arrangement whereby the output current of the generator may be automatically caused to follow a predetermined voltage current characteristic.

According to the present invention an electric motor and a generator are mechanically coupled, and the motor is provided with a field exciting winding partly or wholly excited by or in accordance with the current flowing through the generator, and the generator is provided with a field exciting winding partly or wholly excited by or in accordance with the current through the motor. Such an arrangement has an effect analogous to that which obtains in machines known as metadynes, such as are described in my U. S. Patents Nos. 1,987,417, 2,038,380, 1,969,699 and 2,049,389, since the terminals of the motor may be regarded as the primary brushes of a metadyne, whilst the terminals of the generator may be regarded as the secondary brushes of the same metadyne. Conveniently the excitation currents of the motor and the generator are supplied from separate exciter machines so arranged that the exciter supplying the motor is provided with a field exciting winding excited by the current flowing through the generator, whilst the exciter supplying the generator is provided with a field exciting winding excited by the current flowing through the motor. The exciter dynamo-electric machines may be conveniently constituted by constant current type machines.

By the term "constant current type machine" there is contemplated a machine in which the output current is automatically controlled by one or more of its field exciting windings and caused to follow a predetermined characteristic, for instance to remain constant independently of the load. Examples of constant current type machines are the metadyne and the Kraemer dynamo.

The metadyne is direct current machine provided with commutator and having two separate sets of brushes. One set of brushes, called primary brushes, being kept at a constant voltage the value of the said constant voltage being any value different from zero or equal to zero; and the other pair of brushes, called secondary brushes, supplying the electrical consumer or load with a substantially constant current.

The operation of the metadyne is mainly based upon the interaction between the two armature currents, the flux due to the ampere turns of the one, inducing the voltage between the brushes of the other current. Metadynes also may be provided with stator field exciting windings, which are used only for controlling the value of the constant current supplied by the secondary brushes of the metadyne.

In accordance with the present invention, the excitation current of each dynamo-electric machine is supplied by a separate constant current type exciter dynamo-electric machine, each exciter machine having field exciting windings able to control the value of the constant current supplied by the exciter machine as a function of various operating characteristics, such as the armature current of the main machine excited by the exciter dynamo-electric machine, the armature current of the main machine which is excited by the other exciter machine, an adjustable current supplied by some independent source, a current sensitive to the speed of the motor generator set and as a function of the voltage across the brushes of the main generator.

These field exciting windings have their magnetic axis in the same direction as the armature ampere turns corresponding to the secondary brushes. The value of the current supplied by the secondary brushes of the metadyne, is directly controlled by the ampere turns of the said secondary variator field exciting windings.

In the illustrated arrangement, the secondary variator field exciting windings of the metadyne exciters have three or more members, one member being traversed by the armature current of the main machine, which is excited by the metadyne exciter, another member being traversed by the armature current of the main machine excited by the other exciter metadyne, a third member traversed by adjustable current supplied by some independent source, a fourth member traversed by a current sensitive to the speed variation of the motor-generator set, and a fifth member connected across the brushes of the main generator. In such arrangement the ampere turns created by the field exciting windings of the main machines will be a desired function of the armature current of the machine, a function of the armature current of the other main machine, a function of an adjustable current supplied by an independent source, a function of the speed of the motor-generator set and a function of the voltage of the main generator, and the operation of the exciter metadyne dynamo-electric machine will be similar to the operation of a main metadyne. A metadyne exciter is preferred to other constant current dynamo-electric machines because of its rapid response under transient conditions.

In order that the invention may be more clearly understood, it will now be described with reference to the drawings.

Figure 2:
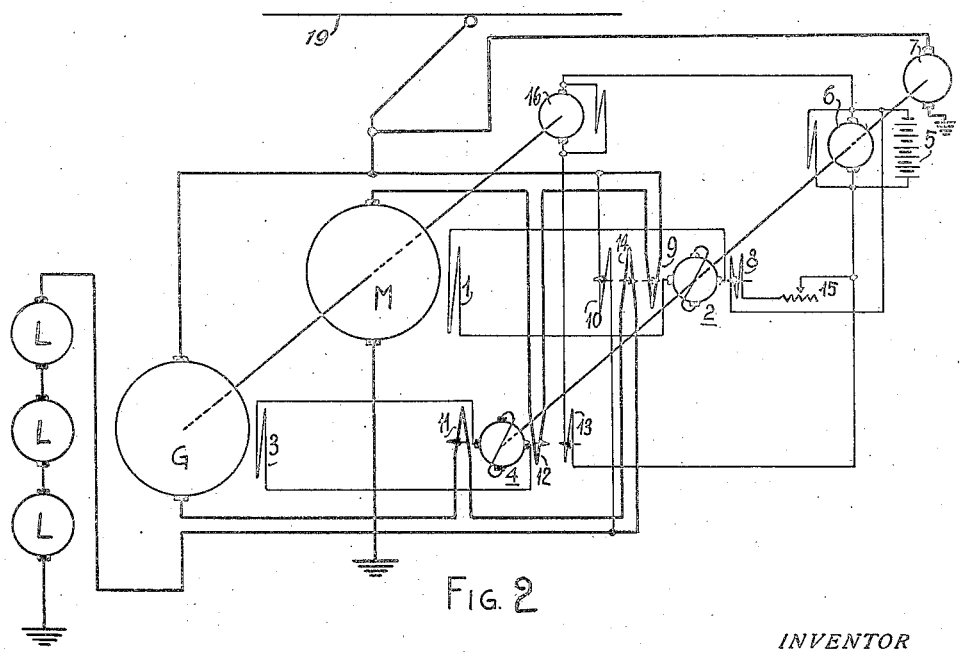
Figure 3:
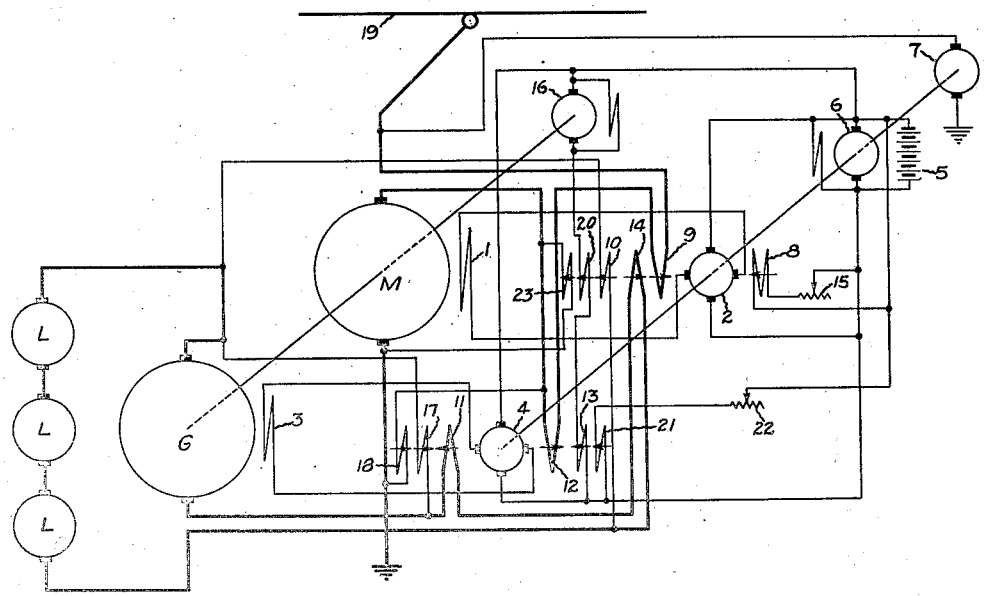
Figure 4:
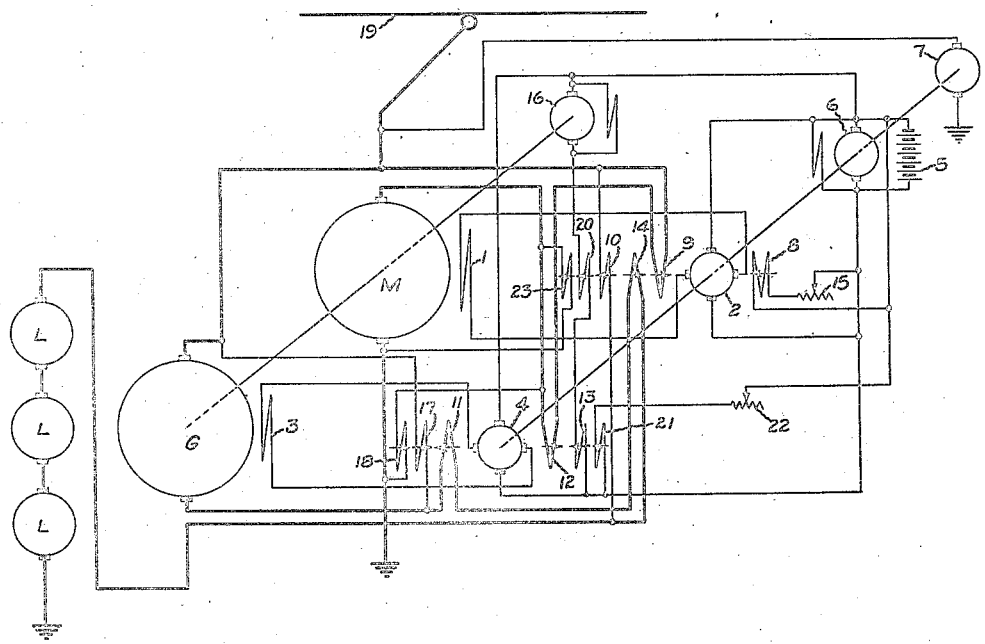

Figure 1 shows diagrammatically a motor-generator set embodying the invention, where the electrical consumers or loads are exclusively fed by the generator. Figure 2 shows diagrammatically an arrangement embodying the invention where the generator acts as a booster and the electrical consumers or loads are fed by the line as well. Fig. 3 is a diagrammatic illustration of a power system similar to that shown in Fig. 1 in which additional variator field exciting windings are provided on the metadyne exciters; and Fig. 4 illustrates a power system similar to that shown in Fig. 2 with additional variator field exciting windings provided on the metadyne exciters.

In Fig. 1, which as above stated, shows an example of an application of the invention to a motor-generator set, the motor M is provided with a field exciting winding 1 which is fed from the secondary brushes of a metadyne generator 2 acting as an exciter, whilst similarly the generator G is provided with a field exciting winding 3 which is fed from the secondary brushes of the metadyne generator 4. The metadyne exciters are shown as having their primary brushes short-circuited, this arrangement, per se, being well known. The current supplied by the exciter 2 to the field exciting winding 1 of the motor is determined by the resultant action of three secondary variator field exciting windings of which the field exciting winding 14 is connected in series with the generator, the field exciting winding 9 is connected in series with the motor and corresponds to a primary stabilizing field exciting winding of the metadyne to which the machines M and G are regarded as equivalent, as hereinbefore explained. The field exciting winding 8 is excited from a source of constant voltage consisting of a battery 5 and corresponds to a secondary variator field exciting winding of the metadyne to which the machines M and G are equivalent. The variator winding 14 has an effect similar to the action of the secondary current in respect with the primary brushes of a metadyne. Finally the variator field exciting winding 10 is connected across the brushes of the generator and is used for modifying the current supplied by the secondary brushes of the metadyne exciter 2 as a function of the voltage of the generator 9. The current of the exciter 4 which supplies the field winding of the generator is similarly controlled by the resultant action of three variator field exciting windings of which the winding 12 is connected in series with the motor, the winding 11 is connected in series with the generator and corresponds to the secondary stabilizing winding of the metadyne aforementioned, whilst the winding 13 is excited by a voltage dependent upon the speed of the main dynamo-electric machine, such as the differential voltages between the battery 5 and an auxiliary machine 16 which is mounted on the same shaft as the motor M and generator G, and corresponds to the regulator field exciting winding of the metadyne aforementioned. The machine 16 preferably consists of an unsaturated shunt generator which is so arranged that at the speed at which it is desired the set shall run, it generates an electromotive force which substantially neutralizes or is equal and opposite to that of battery 5 so that at this speed no current will flow through the variator field exciting winding 13. Any departure from this critical speed however will upset the balance of the electromotive force so that current will flow through the variator field exciting winding 13.

A rheostat 15 is shown included in the circuit between the battery 5 and the variator field exciting winding 8 of the exciter 2. This provides a manual control of the current supplied to the load motors L, as would be the case if the dynamo-electric machines M and G were replaced by the equivalent metadyne. As shown, a dynamo electric machine 6 has its terminals connected across the battery 5 for the purpose of maintaining the battery 5 charged whilst the three dynamo-electric machines 4, 2 and 6 may be driven in any suitable manner, such as by a motor 7 supplied from a source of electrical power supply 19. The direction of the ampere turns of the various members of the variator windings varies with the load and usually changes during the transition from accelerating operation of the motors L, L, to a braking one; nevertheless on the figures the arrows have been shown but they correspond only to the case where the machines L, L operate as accelerating motors.

Figure 2 shows a similar arrangement to that of Fig. 1 except that in this case the load motors L are supplied directly from the supply in series with the generator G which acts as a booster. This arrangement may be regarded as analogous to the Fig. 8 arrangement of a metadyne as described for instance in my U. S. Patent No. 1,969,699. The load may be equally divided part being connected between the generator and the positive supply and part being connected between the generator and the negative supply or it may be unequally distributed on the two sides of the generator or may be concentrated on one side only of the generator. The arrows of the various members of the variator windings correspond in the figure to the case where the generator G supplies an electromotive force in the same direction as the main line.

In each of the arrangements shown in Figs. 1 and 2 a group of load motors L is shown connected in series; this series connection may of course be replaced by a parallel connection or even a series parallel connection of the load motors L.

The arrangements shown in Figs. 1 and 2 may be modified as shown in Figs. 3 and 4, respectively, by adding one further variator winding 17 to the metadyne exciter 4 connected across any suitable separate source of electrical power supply the brushes of the generator G, and a variator field exciting winding 18 connected across the motor M for the purpose of modifying the voltage-current characteristic of the energy supplied to the consumers L in any predetermined desired manner, such as to obtain a drooping voltage-current characteristic. To obtain this result the field-exciting windings 17 and 18 are arranged to produce an excitation opposed to that produced by the series variator field exciting windings 11, as indicated by the arrows in Figs. 3 and 4. Furthermore, a variator field exciting winding 20 traversed by the current sensitive to the speed may be provided on the metadyne 2 instead of being only the variator field exciting winding 13 on the metadyne 4 or both may be used, as shown in Figs. 3 and 4. Further, in Figs. 1 and 2 the metadyne exciters are shown with their primary brushes short-circuited, i. e. metadynes where the value of the constant voltage at which the primary brushes are kept, is zero. As shown in Figs. 3 and 4, the primary brushes of the metadyne exciters may be connected to any constant voltage source, for instance to the terminals of the battery 5. Furthermore, field exciting windings 21 also may be arranged to excite the metadyne exciters 4 in accordance with any desired predetermined characteristic by controlling the current which energizes this winding, as by variable resistors 22. Field exciting windings 23 also may be provided for the exciters 2 energized in accordance with the voltage across the main motor M to provide a shunt field effect opposed to the series field exciting windings 9 and 11.

As shown in the drawings, the field exciting windings of the metadyne dynamo-electric machine exciters all are arranged to provide magnetic excitations to the respective machines having their magnetic axes along the same axes as the magnetic excitation produced by the currents in the armatures of the metadyne exciters and supplied to the main machine field exciting windings, that is, along the secondary commutating axes thereof.

Modifications of the circuit arrangements, which I have described, as employed in my improved system, will occur to those skilled in the art. I desire it to be understood, therefore, that my invention is not to be limited to the particular embodiments thereof set forth and I intend, in the appended claims, to cover all modifications which do not depart from the spirit and scope of my invention.

What I claim as new and desired to secure by Letters Patent of the United States, is:

1. A motor-generator set provided with a generator having an armature, a motor having an armature arranged to drive said generator, a field exciting winding for said motor, a first source of direct constant current electrical power supply, means for connecting said motor field exciting winding to said first source of direct constant current supply, a field exciting winding for said generator, a second source of direct constant current electrical power supply, means for connecting said generator field exciting winding to said second source of direct constant current supply, means for controlling the current of said first and said second sources of direct current supply in accordance with the armature current of said motor, means for controlling the current of said first and said second sources of direct current supp'y in accordance with the armature current of said generator, means for controlling the current of said first and said second sources of direct current supply in accordance with the voltage of said motor, means for controlling the current of said first and said second sources of direct current supply in accordance with the voltage of said generator, means for controlling the current of said first and said second sources of direct current supply in accordance with a current responsive to the speed of said set, means for controlling the current of said first source of direct current supply in accordance with a predetermined controlled current, and means for controlling the current of said second source of direct current supply in accordance with a predetermined controlled current.

2. A motor-generator set provided with a generator having an armature, a motor having an armature arranged to drive said generator, a field exciting winding for said motor, a first dynamo-electric machine of the metadyne type arranged to energize said motor field exciting winding, a field exciting winding for said generator, a second dynamo-electric machine of the metadyne type arranged to energize said generator field exciting winding, means for controlling the current of said first and said second metadyne dynamo-electric machines in accordance with the armature current of said motor, means for controlling the current of said first and said second metadyne dynamo-electric machines in accordance with the armature current of said generator, means for controlling the current of said first and said second metadyne dynamo-electric machines in accordance with the voltage of said motor, means for controlling the current of said first and said second metadyne dynamo-electric machines in accordance with the voltage of said generator, means for controlling the current of said first and said second metadyne dynamo-electric machines in accordance with a current responsive to the speed of said set, means for controlling the current of said first metadyne dynamo-electric machine in accordance with a predetermined controlled current, and means for controlling the current of said second metadyne dynamo-electric machine in accordance with a predetermined controlled current.

3. A motor-generator set provided with a generator having an armature, a motor having an armature arranged to drive said generator, a field exciting winding for said motor, a first dynamo-electric machine of the metadyne type having an armature arranged to energize said motor field exciting winding, a field exciting winding for said generator, a second dynamo-electric machine of the metadyne type having an armature arranged to energize said generator field exciting winding, field exciting windings on each of said metadyne dynamo-electric machines arranged to provide magnetic excitations thereto having magnetic axes along the same axes as the magnetic excitations produced by current in said metadyne armatures supplied to said motor and said generator field exciting windings, means for controlling the armature current of said first and said second metadyne dynamo-electric machines in accordance with the armature current of said motor, and means for controlling the armature current of said first and said second metadyne dynamo-electric machines in accordance with the armature current of said generator, means for controlling the armature current of said first and said second metadyne dynamo-electric machines in accordance with the voltage of said motor, means for controlling the armature current of said first and second metadyne dynamo-electric machines in accordance with the voltage of said generator, means for controlling the armature current of said first and said second metadyne dynamo-electric machines in accordance with a current responsive to the speed of said set, means for controlling the armature current of said first metadyne dynamo-electric machine in accordance with a predetermined controlled current, and means for controlling the armature current of said second metadyne dynamo-electric machine in accordance with a predetermined controlled current.

4. A motor-generator set provided with a generator having an armature, a motor having an armature arranged to drive said generator, a field exciting winding for said motor, a first dynamo-electric machine of the metadyne type having an armature arranged to energize said motor field exciting winding, a field exciting winding for said generator, a second dynamo-electric machine of the metadyne type having an armature arranged to energize said generator field exciting winding, field exciting windings on each of said metadyne dynamo-electric machines arranged to provide magnetic excitations thereto having magnetic axes along the same axes as the magnetic excitations produced by current in said metadyne armatures supplied to said motor and said generator field exciting windings, said first and said second metadyne dynamo-electric machine field exciting windings each including a field exciting winding energized in accordance with the armature current of said motor, a field exciting winding energized in accordance with the armature current of said generator, said first metadyne dynamo-electric machine field exciting windings including a field exciting winding energized in accordance with the voltage of said generator, a field exciting winding energized in accordance with a separate source of constant voltage, and said second metadyne dynamo-electric machine field exciting windings including a field exciting winding energized in accordance with a current responsive to the speed of said set.

5. A motor-generator set provided with a generator having an armature, a motor having an armature arranged to drive said generator, a field exciting winding for said motor, a first source of direct constant current electrical power supply, means for connecting said motor field exciting winding to said first source of direct constant current supply, a field exciting winding for said generator, a second source of direct constant current electrical power supply, means for connecting said generator field exciting winding to said second source of direct constant current supply, means for controlling the current of said first source of direct current supply in accordance with the armature current of said motor, means for controlling the current of said second source of direct current supply in accordance with the armature current of said generator, means for controlling the current of said first and said second sources of direct current supply in accordance with the voltage of said motor, means for controlling the current of said first and said second sources of direct current supply in accordance with the voltage of said generator, means for controlling the current of said first source of direct current supply in accordance with a predetermined controlled current, and means for controlling the current of said second source of direct current supply in accordance with a predetermined controlled current.

6. A motor-generator set provided with a generator having an armature, a motor having an armature arranged to drive said generator, a field exciting winding for said motor, a first dynamo-electric machine of the metadyne type arranged to energize said motor field exciting winding, a field exciting winding for said generator, a second dynamo-electric machine of the metadyne type arranged to energize said generator field exciting winding, means for controlling the current of said first metadyne dynamo-electric machine in accordance with the armature current of said motor, means for controlling the current of said second metadyne dynamo-electric machine in accordance with the armature current of said generator, means for controlling the current of said first and said second metadyne dynamo-electric machines in accordance with the voltage of said motor, means for controlling the current of said first and said second metadyne dynamo-electric machines in accordance with the voltage of said generator, means for controlling the current of said first metadyne dynamo-electric machine in accordance with a predetermined controlled current, and means for controlling the current of said second metadyne dynamo-electric machine in accordance with a predetermined controlled current.

7. A motor-generator set provided with a generator having an armature, a motor having an armature arranged to drive said generator, a field exciting winding for said motor, a first dynamo-electric machine of the metadyne type having an armature arranged to energize said motor field exciting winding, a field exciting winding for said generator, a second dynamo-electric machine of the metadyne type having an armature arranged to energize said generator field exciting winding, field exciting windings on each of said metadyne dynamo-electric machines arranged to provide magnetic excitations thereto having magnetic axes along the same axes as the magnetic excitations produced by current in said metadyne armatures supplied to said motor and said generator field exciting windings, means for controlling the armature current of said first metadyne dynamo-electric machine in accordance with the armature current of said motor, means for controlling the armature current of said second metadyne dynamo-electric machine in accordance with the armature current of said generator, means for controlling the armature current of said first and said second metadyne dynamo-electric machines in accordance with the voltage of said motor, means for controlling the armature current of said first and said second metadyne dynamo-electric machines in accordance with the voltage of said generator, means for controlling the armature current of said first metadyne dynamo-electric machine in accordance with a predetermined controlled current, and means for controlling the armature current of said second metadyne dynamo-electric machine in accordance with a predetermined controlled current.

8. A motor-generator set provided with a generator having an armature, a motor having an armature arranged to drive said generator, a field exciting winding for said motor, a first dynamo-electric machine of the metadyne type having an armature arranged to energize said motor field exciting winding, a field exciting winding for said generator, a second dynamo-electric machine of the metadyne type having an armature arranged to energize said generator field exciting winding, field exciting windings on each of said metadyne dynamo-electric machines arranged to provide magnetic excitations thereto having magnetic axes along the same axes as the magnetic excitations produced by current in said metadyne armatures supplied to said motor and said generator field exciting windings, said first metadyne dynamo-electric machine field exciting windings including a field exciting winding energized in accordance with the armature current of said motor, a field exciting winding energized in accordance with a separate source of constant voltage, said second metadyne dynamo-electric machine field exciting windings including a field exciting winding energized in accordance with a current responsive to the speed of the set, a field exciting winding energized in accordance with the armature current of said generator, and a field exciting winding energized in accordance with the voltage of said generator.

9. A motor-generator set provided with a generator having an armature, a motor having an armature arranged to drive said generator, a field exciting winding for said motor, a first dynamo-electric machine of the metadyne type having an armature arranged to energize said motor field exciting winding, a field exciting winding for said generator, a second dynamo-electric machine of the metadyne type having an armature arranged to energize said generator field exciting winding, field exciting windings on each of said metadyne dynamo-electric machines arranged to provide magnetic excitations thereto having magnetic axes along the same axes as the magnetic excitations produced by current in said metadyne armatures supplied to said motor and said generator field exciting windings, said first and said second metadyne dynamo-electric machine field exciting windings each including a field exciting winding energized in accordance with the armature current of said motor, a field exciting winding energized in accordance with the armature current of said generator, a field exciting winding energized in accordance with the voltage of said motor, a field exciting winding energized in accordance with the voltage of said generator, a field exciting winding energized in accordance with a current responsive to the speed of said set, and a field exciting winding energized in accordance with a predetermined controlled current.

JOSEPH M. PESTARINI.